E. KESLER.
ANIMAL TRAP.
APPLICATION FILED OCT. 16, 1914.

1,191,706.

Patented July 18, 1916.

Elias Kesler, Inventor.

UNITED STATES PATENT OFFICE.

ELIAS KESLER, OF OKLAHOMA, OKLAHOMA.

ANIMAL-TRAP.

1,191,706.  Specification of Letters Patent.  Patented July 18, 1916.

Application filed October 16, 1914. Serial No. 867,024.

*To all whom it may concern:*

Be it known that I, ELIAS KESLER, a citizen of the United States, residing at Oklahoma City, in the county of Oklahoma and State of Oklahoma, have invented a new and useful Improvement in Animal-Traps, of which the following is a specification.

This invention relates to improvements in animal traps, and especially to an entrance or tunnel leading into the confining chamber or cage of such traps; such tunnel or entrance being constructed independent so that it can be adjusted to any trap cage desired.

The invention consists in the construction, combination and arrangement of platforms, gate, automatic lock and devices hereinafter claimed and described.

Figure 1:
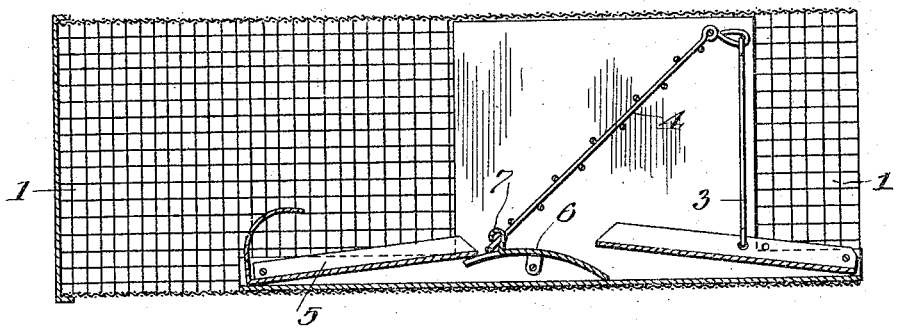
Figure 2:
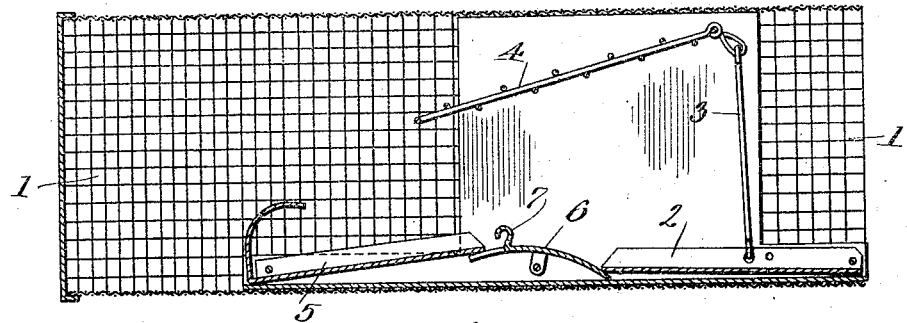
Figure 3:
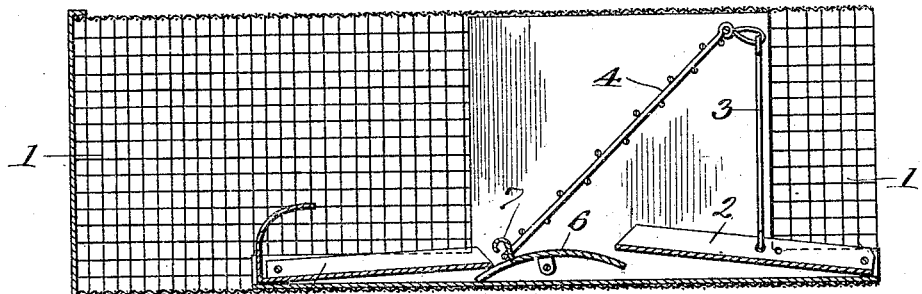

In the accompanying drawings:—Figure 1 represents a vertical sectional view of the invention in position in an ordinary trap chamber, the platforms, gate, and automatic lock being indicated in a normal position. Fig. 2 is a similar view as an animal steps upon the entrance platform; the gate being released and raised, and the entrance into the confining chamber of the trap cleared of all obstruction. Fig. 3 is another view where an animal, having entered the confining chamber of the trap, attempts to return by the route it entered the trap; the gate having returned to its normal or set position is, by the weight of the animal, caused to engage the automatic lock, thus preventing an exit from the confining chamber.

My invention or improvement may be made of any suitable material, depending upon the size and character of the animal it is intended to trap; and the cage may also be made of any suitable size or material.

The entrance tunnel, which is my invention, here indicated, is constructed of wire mesh walls, 1 representing the vertical side walls. The animal enters the tunnel on the platform, 2. As it advances along said platform the weight of the animal causes said platform to drop. The platform 2 is attached to the gate, 4, by the rod, 3. The weight of the animal on 2 causes the gate, 4, by means of the rod, 3, to be raised, clearing the entrance to the confining chamber. The animal then passes over the tilting lever, 6, onto the platform, 5, the gate, 4, falling behind the animal. An animal once entering the confining chamber of a trap through my improved tunnel, seeking to return through the tunnel passes upon platform, 5. Said platform 5, being hinged at its lower end, is lowered by the weight of the animal until it causes the tilting lever, 6, to incline toward 5. The gate, 4, being of woven wire mesh, or other suitable material, engages a hook or lock, 7, preventing the animal from lifting the gate, 4, and automatically locks the tunnel from the inside as well as the outside. The escape of the animal is thus prevented.

It will be understood from the foregoing description that an animal can easily enter my improved tunnel, and without being injured thereby, and that after once entering a trap fitted with my improved tunnel, cannot escape therefrom.

While I have here shown and described a preferred form of my invention, I would have it understood that changes may be made in the form, proportion and construction of the same without departing from the spirit of my invention, and within the scope of the appended claim.

I claim—

An entrance tunnel leading into the confining chamber of an animal trap, a platform pivoted in said tunnel, a reticulate gate pivoted at its upper end in the tunnel, connections between the gate and the platform to raise the gate upon depression of the said platform, a tilting lever upon which the lower end of the gate rests, said lever being provided with a hook, and a second pivoted platform having one end bearing on the tilting lever to force the hook into engagement with the lower cross-bar of the gate upon depression of the second-named platform.

ELIAS KESLER.

Witnesses:
H. M. SINCLAIR,
L. D. PIMUCK.

Copies of this patent may be obtained for five cents each, by addressing the "Commissioner of Patents, Washington, D. C."